April 7, 1925.

J. G. VINCENT

HYDROCARBON MOTOR

Original Filed July 30, 1917

1,532,283

Inventor
Jesse G. Vincent,

By Milton Tibbetts
Attorney.

Patented Apr. 7, 1925.

1,532,283

UNITED STATES PATENT OFFICE.

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

HYDROCARBON MOTOR.

Original application filed July 30, 1917, Serial No. 183,587. Divided and this application filed August 23, 1920. Serial No. 405,493.

*To all whom it may concern:*

Be it known that I, JESSE G. VINCENT, a citizen of the United States, and resident of Detroit, Wayne County, State of Michigan, have invented certain new and useful Improvements in Hydrocarbon Motors, of which the following is a specification.

This application is a division of my application Serial No. 296,276 filed May 10, 1919, which application is in turn a division of an application resulting in Patent No. 1,321,866, dated November 18, 1919.

This invention relates to methods of connecting metal parts, such as the forming of built-up cylinder blocks.

One of the objects of the invention is to connect metal parts by a novel method or process.

Another object of the invention is to build up a motor cylinder by a novel method.

Other objects of the invention will appear from the following description, taken together with the drawings which form a part of this specification, and in which—

Figure 1:
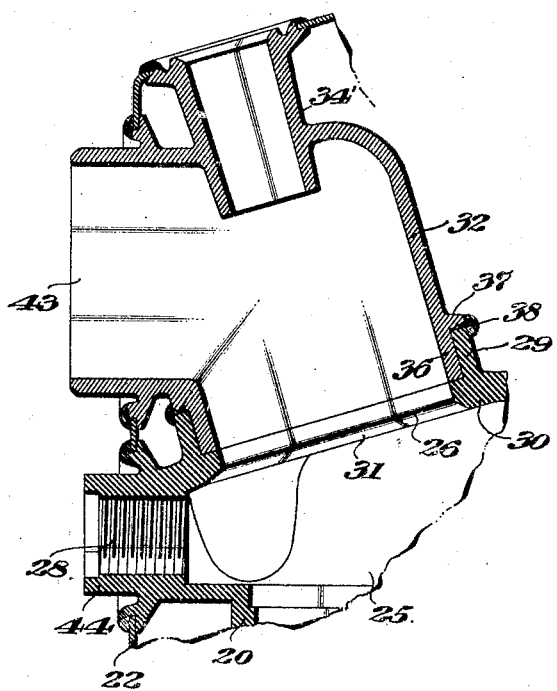
Figure 1 is a sectional view through a portion of a motor cylinder made in accordance with this invention.

Referring to the drawings, the motor cylinder 20 is preferably made of a steel forging machined both inside and outside, with a compression space 25 at its upper or inner end and with inlet and outlet ports, one of which is shown at 26, and with a spark plug port 28 communicating with the compression space. The cylinder at the port 26 is extended slightly beyond the port in the form of a tubular part 29, and an internal shoulder 30, spaced from the end of the tubular part and adjacent to valve seat portion 31 of the port, is formed during the machining operation.

An elbow-like part 32 is secured to the cylinder proper at the port 26 to form the intake or exhaust passage for the motor. Such elbow 32 has a tubular part 36 formed to fit within the tubular part 29 of the cylinder proper and to have its end abut against the shoulder 30, and an external flange 37 is formed on the elbow, so that when the parts are placed together, as shown in Fig. 1, said flange 37 is adjacent to the end of the tubular part 29. As shown, the flange 37 is slightly tapered so there is not a close fit between it and the end of the tubular part 29, and for the purpose of making a welded joint between these two parts a piece of wire 38 is placed around the loose joint and a welding heat is applied to the wire and to the adjacent parts of the tubes and the wire and the adjacent parts are thereby fused together. The resulting welded joint is shown in Fig. 1.

Figure 2:
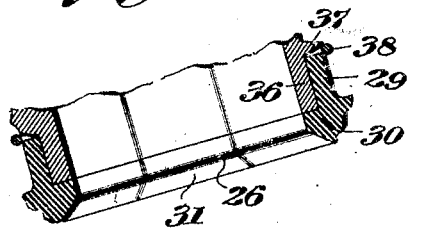
Figure 2 is a fragmentary view of the contiguous parts of the cylinder and elbow, showing the form of the parts before the welding of them together has been effected.
Figure 3:
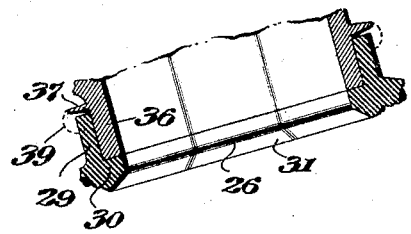
Figure 3 is similar to Figure 2 except for a slight change in formation of the parts.

Figure 3 shows the same arrangement of tubular parts, but in this case the wire 38 is omitted and in forming the joint a welding heat is applied directly to the flange 37 (which in its formation was changed slightly from the form shown in Figs. 1 and 2), and to the end of the tubular part 29 so that these two parts are directly joined together. The joint is shown in dotted lines at 39.

The cylinder and elbow above referred to are formed with an upwardly projecting boss 34' and with a projecting end 43 on the elbow and with a boss 44 in which the spark plug port 28, above referred to, is arranged. A jacket 22, preferably of sheet metal, is secured to these three parts of the motor cylinder by a novel welding method which forms the subject matter of application Serial No. 296,276, above referred to, and will not be herein further described.

It will be understood that modifications may be made in the above described method without departing from the spirit or scope of this invention.

Having thus described my invention, what I claim and desire to secure by Letters Patent is:

1. A method of welding two tubular parts together consisting in forming an annular shoulder interiorly of one such part and spaced from the end thereof, forming a similar shoulder on the other such part also spaced from the end thereof, telescoping the parts so that the end of the inner part abuts against the internal shoulder of the outer part and the shoulder of the inner part is adjacent the end of the outer part, and heating the shoulder of the inner part and the adjacent end of the outer part to cause them to flow together.

2. A method of welding two tubular parts together consisting in forming an annular shoulder interiorly of one such part and spaced from the end thereof, forming a similar shoulder on the other such part also spaced from the end thereof, telescoping the parts so that the end of the inner part abuts against the internal shoulder of the outer part and the shoulder of the inner part is adjacent the end of the outer part, placing a strip of metal around the external joint, and heating said strip and adjacent parts to cause them to flow together.

3. A method of welding two tubular parts together consisting in forming an annular shoulder interiorly of one such part and spaced from the end thereof, forming a similar shoulder on the other such part also spaced from the end thereof, telescoping the parts so that the end of the inner part abuts against the internal shoulder of the outer part and the shoulder of the inner part is adjacent the end of the outer part, placing a strip of metal around the external joint between the shoulder of the inner part and the end of the outer part, and heating the strip and the adjacent shoulder and end to cause them to flow together.

4. A method of welding two tubular parts together consisting in forming each such part with an annular shoulder spaced from the end thereof, telescoping the parts so that the end of the inner part abuts against the shoulder of the outer part and the shoulder of the inner part is adjacent to the end of the outer part, and heating the shoulder of the inner part and adjacent end of the outer part to cause them to flow together.

5. A method of welding two tubular parts together consisting in forming each such part with an annular shoulder spaced from the end thereof, telescoping the parts to form a joint so that the end of the inner part abuts against the shoulder of the outer part, placing a strip of metal around the external joint, and heating said strip and the adjacent parts to cause them to flow together.

In testimony whereof I affix my signature.

JESSE G. VINCENT.